(12) United States Patent
de Molina

(10) Patent No.: US 7,320,388 B2
(45) Date of Patent: Jan. 22, 2008

(54) STROKE DEPENDENT DAMPING

(75) Inventor: Simon A de Molina, Marche-les-Dames (BE)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 629 days.

(21) Appl. No.: 10/662,547

(22) Filed: Sep. 15, 2003

(65) Prior Publication Data

US 2005/0056501 A1    Mar. 17, 2005

(51) Int. Cl.
*F16F 9/50* (2006.01)
(52) U.S. Cl. .................................. 188/287; 188/281
(58) Field of Classification Search ................ 188/275, 188/281, 287, 289
See application file for complete search history.

(56) References Cited

U.S. PATENT DOCUMENTS

| | | | |
|---|---|---|---|
| 1,620,112 A | | 3/1927 | Lewis |
| 1,921,121 A | | 8/1933 | Head |
| 2,148,839 A | | 2/1939 | Rossman et al. |
| 4,071,122 A | * | 1/1978 | Schupner .................. 188/285 |
| 4,133,415 A | * | 1/1979 | Dressell et al. ............ 188/285 |
| 4,298,101 A | * | 11/1981 | Dressell et al. ............ 188/285 |
| 4,397,452 A | | 8/1983 | Fouts |
| 4,623,049 A | | 11/1986 | Warren |
| 4,742,898 A | * | 5/1988 | Lee ............................ 188/287 |
| 4,819,770 A | | 4/1989 | Hahn |
| 5,085,300 A | | 2/1992 | Kato et al. |
| 5,129,488 A | | 7/1992 | Furuya et al. |
| 5,158,267 A | | 10/1992 | Pascal |
| 5,248,014 A | * | 9/1993 | Ashiba .................... 188/282.8 |
| 5,409,090 A | | 4/1995 | Kashiwagi et al. |
| 5,598,904 A | * | 2/1997 | Spyche, Jr. ................ 188/287 |
| 5,667,041 A | | 9/1997 | Jensen |
| 6,006,873 A | * | 12/1999 | Kirst ......................... 188/287 |
| 6,352,145 B1 | * | 3/2002 | DeMolina et al. .......... 188/281 |

FOREIGN PATENT DOCUMENTS

WO    WO 94/17317    *    8/1994

\* cited by examiner

*Primary Examiner*—Chris Schwartz
(74) *Attorney, Agent, or Firm*—Harness, Dickey & Pierce, PLC

(57) ABSTRACT

A two-stage shock absorber has a pressure tube within which a valve assembly is slidably disposed. A piston rod is attached to the valve assembly and extends out of the pressure tube. A ring is slidably disposed within the pressure tube and engages the valve assembly. After a specified amount of movement of the valve assembly with respect to the pressure tube in an extension movement of the shock absorber, the sleeve engages a plurality of spirally positioned bores and reduces the fluid flow through the valve assembly to progressively switch the shock absorber from soft damping to firm damping. In another embodiment the sleeve engages a spiral groove of variable depth to reduce the fluid flow through the valve assembly to progressively switch the shock absorber from soft damping to firm damping.

10 Claims, 4 Drawing Sheets

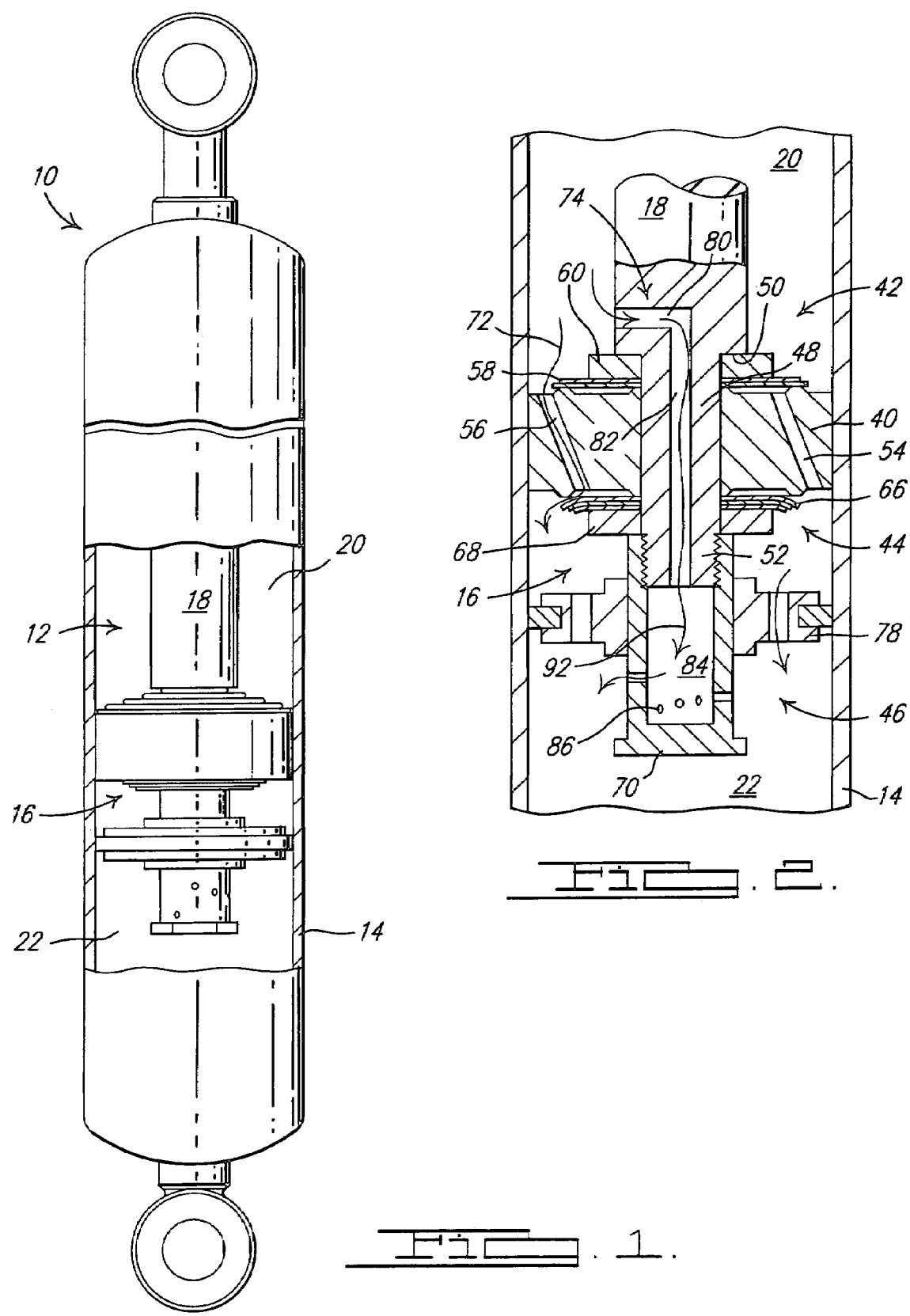

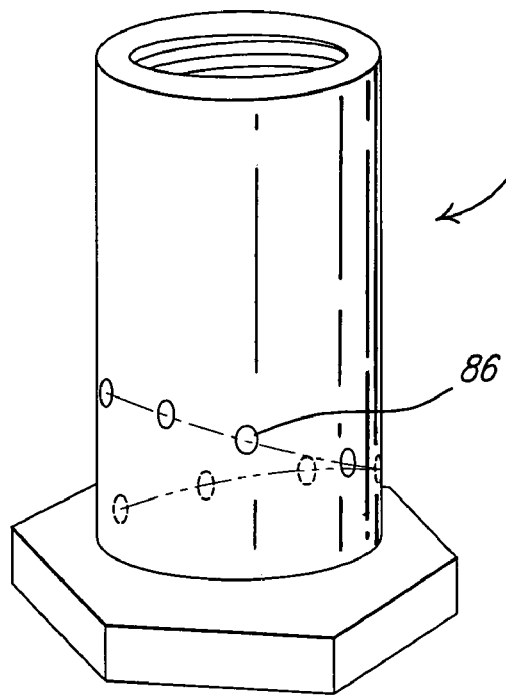
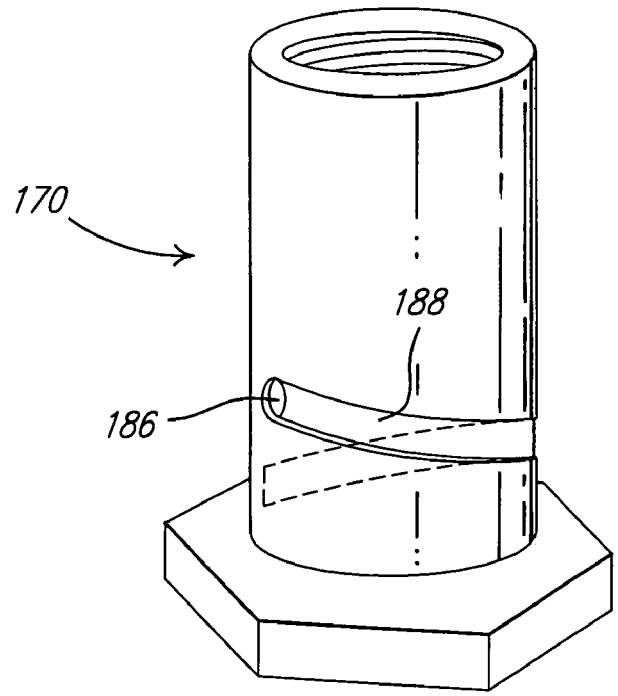
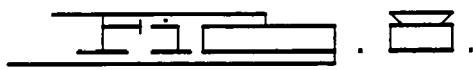

STROKE DEPENDENT DAMPING

FIELD OF THE INVENTION

The present invention relates to a hydraulic damper or shock absorber adapted for use in a suspension system such as the systems used for automotive vehicles. More particularly, the present invention relates to a hydraulic damper having a two-stage damping characteristic where a relatively low level damping force is provided for small amplitudes of movement and a relatively high level of damping is provided for large amplitudes of movement.

BACKGROUND OF THE INVENTION

A conventional prior art hydraulic damper or shock absorber comprises a cylinder defining a working chamber having a piston slidably disposed in the working chamber with the piston separating the interior of the cylinder into an upper and a lower working chamber. A piston rod is connected to the piston and extends out of one end of the cylinder. A first valving system is incorporated for generating damping force during the extension stroke of the hydraulic damper and a second valving system is incorporated for generating damping force during the compression stroke of the hydraulic damper.

Various types of damping force generating devices have been developed to generate desired damping forces in relation to the speed and/or the displacement of the piston within the cylinder. These multi-force damping force generating devices have been developed to provide a relatively small or low damping force during the normal running of the vehicle, and a relatively large or high damping force during maneuvers such as turning or braking. During normal running of the vehicle, the suspension system experiences small or fine vibrations of the un-sprung mass of the vehicle. Thus, there is a need for a soft ride or low damping characteristics of the suspension system to isolate the sprung mass from these vibrations. During a turning or braking maneuver, as an example, the sprung mass of the vehicle will attempt to undergo a relatively slow and/or large vibration which then requires a firm ride or high damping characteristics of the suspension system to support the sprung mass and provide stable handling characteristics to the vehicle. Thus, these multi-force damping force generating devices offer the advantage of a smooth steady state ride by eliminating the high frequency/small excitations from the sprung mass while still providing the necessary damping or firm ride for the suspension system during vehicle maneuvers causing larger excitations of the sprung mass.

The continued development of hydraulic dampers includes the development of multi-force damping force generating devices which are simpler to manufacture, can be manufactured at a lower cost and which improve the desired force generating characteristics.

SUMMARY OF THE INVENTION

The present invention provides the art with a multi-stage hydraulic damper or shock absorber that provides damping which varies according to the stroke amplitude. Soft damping is provided for small strokes and firm damping is provided for large strokes. The variable damping is provided by a sliding sleeve that is frictionally held in place in the pressure cylinder. While the shock absorber undergoes a small stroke, the sliding sleeve remains inactive and the fluid flows through two separate flow paths to provide a soft damping. When the shock absorber undergoes a large stroke, the sliding sleeve moves to progressively close off one of the two flow paths which in turn provides a firm damping. Various design iterations are disclosed for both mono-tube and double tube shock absorbers.

Other advantages and objects of the present invention will become apparent to those skilled in the art from the subsequent detailed description, appended claims and drawings.

BRIEF DESCRIPTION OF THE DRAWINGS

The present invention will become more fully understood from the detailed description and the accompanying drawings, wherein:

FIG. 1 is a cross-sectional side view of a mono-tube shock absorber incorporating the multi-force damping force generating device in accordance with the present invention;

FIG. 2 is a cross-sectional side view illustrating the piston assembly of the shock absorber shown in FIG. 1 during a small extension stroke of the shock absorber;

FIG. 7 is a perspective view of the bypass through the piston nut as shown in FIGS. 1-6; and FIG. 8 is a perspective view of the bypass through the piston nut in accordance with another embodiment of the present invention.

DETAILED DESCRIPTION OF THE PREFERRED EMBODIMENT

Figure 3:
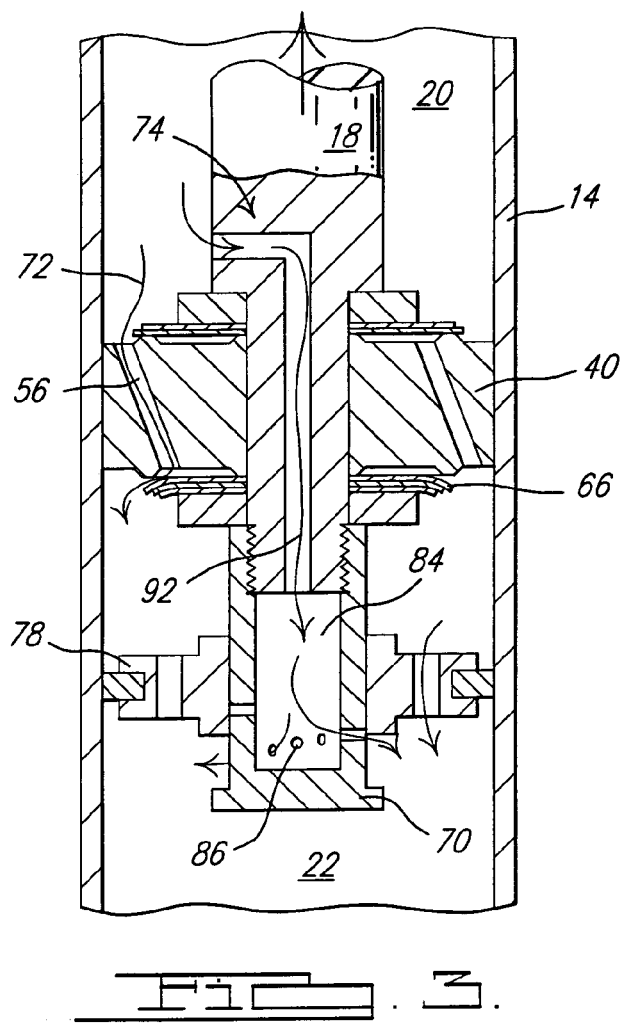
FIG. 3 is a cross-sectional side view illustrating the piston assembly of the shock absorber shown in FIG. 1 during a larger extension stroke of the shock absorber.

Referring now to the drawings in which like reference numerals designate like or corresponding parts throughout the several views, there is shown in FIGS. 1-7, a two-stage mono-tube shock absorber which incorporates the multi-force damping force generating device in accordance with the present invention and which is designated generally by the reference numeral 10. Shock absorber 10 is a mono-tube design and comprises a piston rod assembly 12 and a pressure tube 14. Piston rod assembly 12 includes a piston valve assembly 16 and a piston rod 18. Valve assembly 16 divides pressure tube 14 into an upper working chamber 20 and a lower working chamber 22. Piston rod 18 extends out of pressure tube 14, for attachment to one of the sprung or unsprung mass of the vehicle. Pressure tube 14 is filled with fluid and attaches to the other sprung or unsprung masses of the vehicle. Thus, suspension movements of the vehicle will cause extension or compression movement of piston rod assembly 12 with respect to pressure tube 14 and these movements will be dampened due to the restricted fluid flow between chambers 20 and 22 through piston valve assembly 16.

Referring now to FIG. 2, piston valve assembly 16 is attached to piston rod 18 and comprises a piston body 40, a compression valve assembly 42, an extension or rebound valve assembly 44 and a sliding valve assembly 46. Piston rod 18 includes a reduced diameter section 48 located on the end of the piston rod 18 disposed within pressure tube 14 to form a shoulder 50 for mounting the remaining components of piston valve assembly 16. Piston body 40 is located on reduced diameter section 48 with compression valve assembly 42 being located between piston body 40 and shoulder 50 and with rebound valve assembly 44 being located between piston body 40 and a threaded end 52 of piston rod 18. Piston body 40 defines a plurality of compression flow passages 54 and a plurality of rebound flow passages 56.

Compression valve assembly 42 comprises a plurality of compression valve plates 58 and a compression support plate 60. Valve plates 58 are disposed adjacent to piston body 40 to cover the plurality of compression flow passages 54. Support plate 60 is disposed between valve plates 58 and shoulder 50 to hold valve plates 58 against piston body 40 to close passages 54. During a compression stroke of shock absorber 10, fluid pressure builds up in lower working chamber 22 until the fluid pressure applied to valve plates 58 through passages 54 overcomes the bending load of valve plates 58. Valve plates 58 elastically deflect around the outer edge of support plate 60 to allow fluid to flow from lower working chamber 22 to upper working chamber 20 as shown by arrows 62 in FIGS. 5 and 6.

Rebound valve assembly 44 comprises a plurality of valve plates 66, a rebound support plate 68 and a piston nut 70. Valve plates 66 are disposed adjacent to piston body 40 to cover the plurality of rebound flow passages 56. Support plate 68 is disposed between piston nut 70 and valve plates 66. Piston nut 70 is threaded onto end 52 of piston rod 18 to retain support plate 68 and hold valve plates 66 against piston body 40 to close passages 56. During an extension stroke of shock absorber 10, fluid pressure builds up in upper working chamber 20 until the fluid pressure applied to valve plates 66 through passages 56 overcomes the bending load of valve plates 66. Valve plates 66 elastically deflect around the outer edge of support plate 68 to allow fluid to flow from upper working chamber 20 to lower working chamber 22 as shown by arrows 72 in FIGS. 2-4.

Sliding valve assembly 46 comprises a flow passage 74, a series of bores 86 and a sliding sleeve 78. Flow passage 74 extends through piston rod 18 and includes a radial passage 80 and an axial passage 82 which opens into a chamber 84 defined by piston rod 18 and piston nut 70. The series of bores 86 extending radially through piston nut 70, are created in an evenly spaced, helical pattern, axially along the piston nut 70. Sliding sleeve 78 is slidingly received within pressure tube 14 and slidingly received on piston nut 70 to provide the multi-stage damping characteristics for shock absorber 10.

Figure 4:
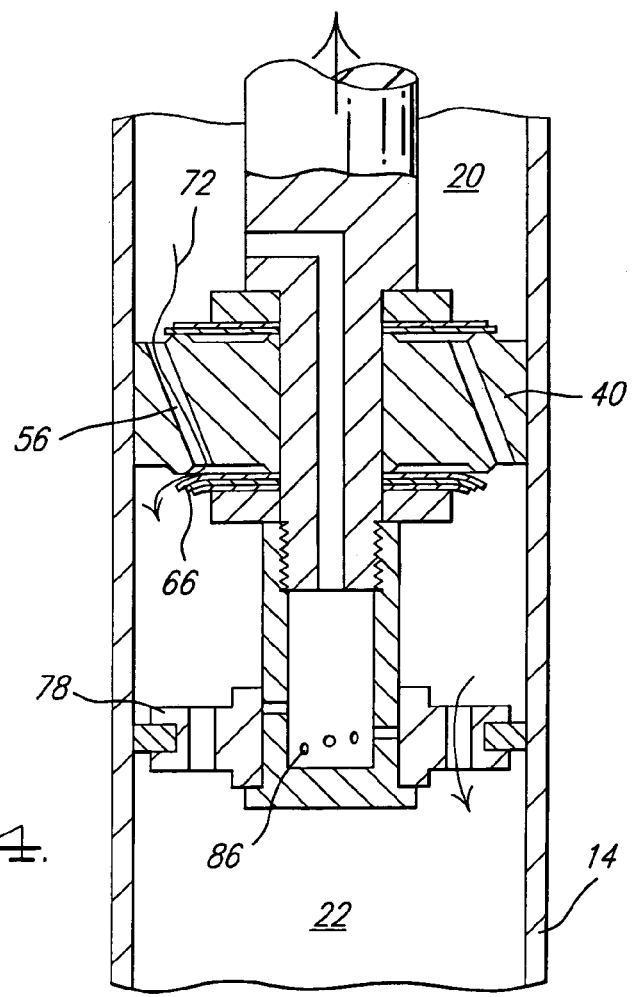
FIG. 4 is a cross-sectional side view illustrating the piston assembly of the shock absorber shown in FIG. 1 during an even larger extension stroke of the shock absorber.
Figure 5:
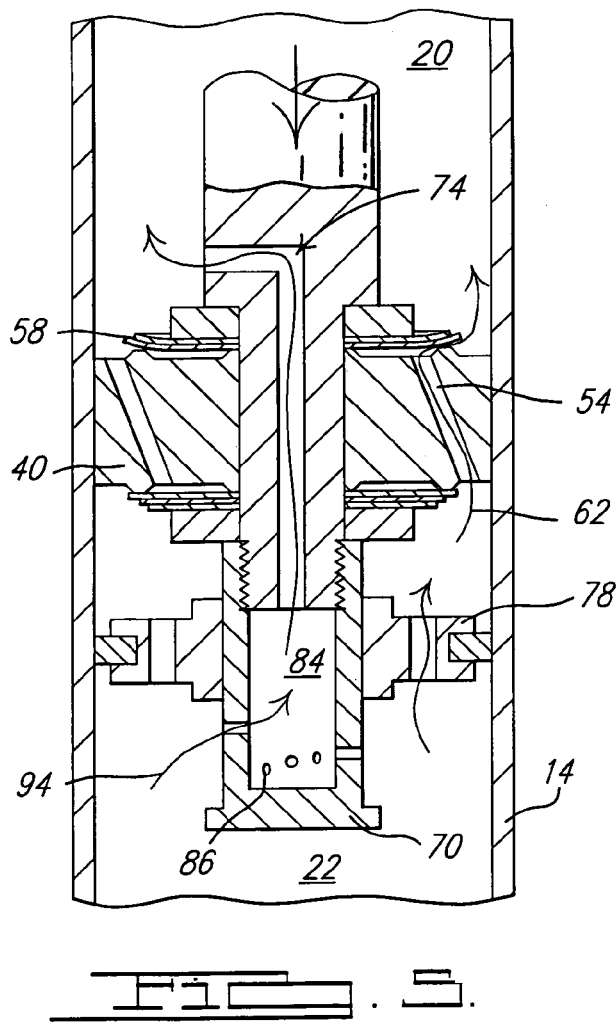
FIG. 5 is a cross-sectional side view illustrating the piston assembly of the shock absorber shown in FIG. 1 during a small compression stroke of the shock absorber.
Figure 6:
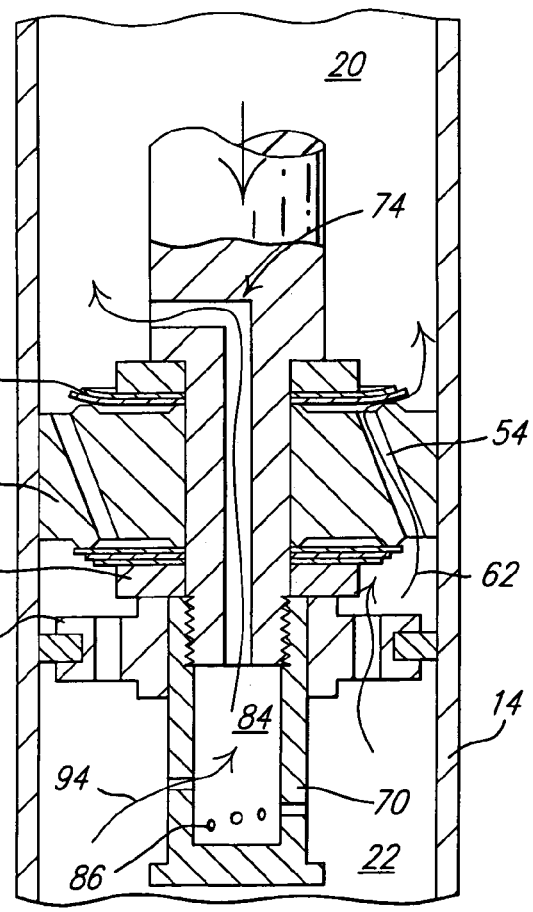
FIG. 6 is a cross-sectional side view illustrating the piston assembly of the shock absorber shown in FIG. 1 during a large compression stroke of the shock absorber.

FIGS. 2 through 6 illustrate the various damping characteristics provided for by piston rod assembly 12 of shock absorber 10. FIG. 2 illustrates a small amplitude extension, FIG. 3 illustrates a larger amplitude extension, FIG. 4 illustrates an even larger amplitude extension, FIG. 5 illustrates a small amplitude compression and FIG. 6 illustrates a large amplitude compression for shock absorber 10.

A small amplitude extension of shock absorber 10 is illustrated in FIG. 2 with arrows 72 and 92 depicting the fluid flow. During small amplitudes of extension, sliding sleeve 78 will only move a small amount with respect to piston nut 70 due to the friction with pressure tube 14 and thus does not restrict fluid flow through passage 74 and bores 86. Fluid flow from upper chamber 20 of pressure tube 14 into lower chamber 22 of pressure tube 14 occurs through two generally parallel paths. The first path is shown by arrow 72 and it extends from upper chamber 20 of pressure tube 14 through passages 56 unseating valve plates 66 from piston body 40 to enter lower chamber 22 of pressure tube 14. Simultaneously, fluid flows through the second flow path as depicted by arrows 92. Fluid flow leaves upper working chamber 20 through passage 74 and enters chamber 84. Fluid flows from chamber 84 through the series of bores 86 in piston nut 70 to also enter lower chamber 22 of pressure tube 14. These dual parallel flow paths shown by arrows 72 and 92 will thus provide a relatively soft ride for small movements of shock absorber 10.

A larger amplitude extension of shock absorber 10 is illustrated in FIG. 3 with arrows 72 and 92 depicting fluid flow. During the larger amplitudes of extension, sliding sleeve 78 will move enough to cover one or more of the passageways comprising bores 86, due to the friction with pressure tube 14 and will progressively close more and more passages comprising bores 86. As shown in FIGS. 3 and 7, the helical series of evenly spaced bores 86 will permit a gradual closing of the entire passage 74 which provides the advantage of the major reduction or elimination of the switching noise typical with a dual-stage damping device. Fluid flow from upper chamber 20 of pressure tube 14 into lower chamber 22 of pressure tube 14 still occurs through the two generally parallel paths shown by arrows 72 and 92 but the second path shown by arrow 92 is progressively being closed off as a function of the amplitude of the stroke. The variable helical pattern of the bores 86 thus provides the shock absorber designer the option of defining the curve between the soft damping characteristics of the shock absorber 10 and the firm damping characteristics of shock absorber 10 and no longer requires him to accept a step function. The first path shown by arrow 72 extends from upper chamber 20 of pressure tube 14 through passages 56 unseating valve plates 66 from piston body 40 to enter lower chamber 22 of pressure tube 14. Simultaneously, fluid flow through the second flow path shown by arrow 92 by leaving upper working chamber 20 through passage 74 and enters chamber 84. Fluid flows from chamber 84 through bores 86 to also enter chamber 22 of pressure tube 14. The amount of fluid flowing through the second flow path shown by arrow 92 will be determined by the position of the sliding sleeve 78 and the number of bores 86 which sliding sleeve 78 covers.

An even larger amplitude extension of shock absorber 10 is illustrated in FIG. 4 with arrow 72 depicting fluid flow. During large amplitudes of extension, sliding sleeve 78 remains in position due to friction and entirely covers all bores 86 preventing fluid flow through the flow path depicted by arrow 92 in FIGS. 2 and 3. Fluid flow from upper chamber 20 of pressure tube 14 into lower chamber 22 of pressure tube 14 occurs through only one path which is the path depicted by arrow 72. As stated above, the path depicted by arrow 72 extends from upper chamber 20 of pressure tube 14 through passage 56 unseating valve plates 66 from piston body 40 to enter lower chamber 22 of pressure tube 14. The flow path depicted by arrow 92, shown in FIGS. 2 and 3, is blocked due to the position of sliding sleeve 78. The single flow path will thus provide a relatively firm ride for larger movements of shock absorber 10.

A small amplitude compression of shock absorber 10 is illustrated in FIG. 5 with arrows 62 and 94 depicting the fluid flow. During small amplitudes of compression, sliding sleeve 78 will move only a small amount with respect to piston nut 70 due to the friction due with pressure tube 14. Fluid flow from lower chamber 22 of pressure tube 14 into upper chamber 20 of pressure tube 14 occurs through two generally parallel paths shown by arrows 62 and 94. The first path is shown by arrow 62 and it extends from lower chamber 22 of pressure tube 14 through passages 54 unseating valve plate 58 from piston body 40 to enter upper chamber 20 of pressure tube 14. Simultaneously, fluid flows through a second flow path as depicted by arrows 94. Fluid flow leaves lower chamber 22 through bores 86 into chamber 84 and through passage 74 to enter upper chamber 20 of pressure tube 14.

A large amplitude compression of shock absorber 10 is illustrated in FIG. 6 with arrows 62 and 94 depicting fluid flow. During large amplitudes of compression, sliding sleeve 78 remains in position due to friction and support plate 68 contacts sliding sleeve 78. Fluid flow from the lower chamber 22 of pressure tube 14 into upper chamber 20 of pressure tube 14 occurs through the same two flow paths described above for small compression movement of shock absorber 10 as shown in FIG. 5. The multi-force damping characteristics for shock absorber 10 of this embodiment only effect extension movement of shock absorber 10 and not compression movements.

Referring now to FIG. 8, a piston nut 170 in accordance with another embodiment of the present invention is illustrated. Piston nut 170 is designed to replace piston nut 70 in shock absorber 10 and thus the discussion above of shock absorber 10 also applies to piston nut 170. The difference between piston nut 170 and piston nut 70 is in the manner that the fluid flows through passage 74.

Piston nut 170 defines a single through bore 186 and a helical groove 188 extending axially along the outer surface of piston nut 170. Helical groove 188 has a depth that varies continuously over the length of helical groove 188. The depth of helical groove 188 is at its maximum valve adjacent bore 186 and at its minimum valve at its opposing terminal end. Sliding sleeve 78 is slidingly received within pressure tube 14 and slidingly received on piston nut 170, similar to piston nut 70, to provide the multi-stage damping characteristics for shock absorber 10.

During small amplitude extensions of shock absorber 10, sliding sleeve 78 will only move a small amount with respect to piston nut 170 due to the friction with pressure tube 14 and thus does not restrict fluid flow through passage 74, bore 186 and groove 188. The fluid flow is similar to that shown in FIG. 2 for piston nut 70.

During larger amplitude extensions of shock absorber 10, sliding sleeve 78 will move enough to cover bore 186 and a portion of groove 188. The movement of sliding sleeve 78 with respect to piston nut 170 will cover more and more of groove 188. Fluid flow will flow from chamber 84, through bore 186 and through groove 188. The continuously varying depth of groove 188 will permit a gradual closing of the entire passage 74 which provides the advantage of the major reduction or elimination of the switching noise typical with a dual-stage damping device. Fluid flow from upper chamber 20 of pressure tube 14 into cover chamber 22 of pressure tube 14 still occurs through the two generally parallel paths depicted by arrows 72 and 92 but the second path depicted by arrow 92 is progressively being closed off as a function of the amplitude of the stroke. The variable depth of groove 188 thus provides the shock absorber designer the option of defining the curve between the soft damping characteristics of shock absorber 10 and the firm damping characteristics of shock absorber 10 and no longer requires him to accept a step function. The fluid flow is similar to that shown in FIG. 3 for piston nut 70.

During even larger amplitude extensions of shock absorber 10 causes sliding sleeve 78 to cover bore 186 and all of groove 188 to close fluid passage 74. Fluid flow from upper chamber 20 of pressure tube 14 into lower chamber 22 of pressure tube 14 occurs only through the path depicted by arrows 72. This single flow path will thus provide a relatively firm ride. The fluid flow is similar to that shown in FIG. 4 for piston nut 70.

Small amplitude compression and large amplitude compression of shock absorber is similar to that illustrated above in FIGS. 5 and 6, respectively, for piston nut 70. During compression strokes for shock absorber 10, bores 186 and 188 are both open providing for the dual path fluid flow as depicted by arrows 62 and 94. The fluid flow is similar to that shown in FIGS. 5 and 6 for piston nut 70.

While the above detailed description describes the preferred embodiment of the present invention, it should be understood that the present invention is susceptible to modification, variation and alteration without deviating from the scope and fair meaning of the subjoined claims.

What is claimed is:

1. A two-stage shock absorber comprising:
   a pressure tube defining a chamber;
   a piston rod assembly disposed within said chamber;
   a valve assembly fixably attached to said piston rod assembly and slidably engaging said pressure tube within said chamber, said valve assembly dividing said chamber into an upper and a lower working chamber, said valve assembly providing a first and a second fluid flow path between said upper and lower working chambers completely through said valve assembly, said first and second flow paths of said valve assembly being totally separate from one another; and
   a sleeve slidably disposed on said piston rod assembly, said piston rod assembly defining a passage and a plurality of holes through said piston rod assembly, the plurality of holes being arranged in a helical spiral formation to create a third separate and distinct flow path extending between said upper and lower working chambers, said sleeve being operable to progressively close said third flow path by sequentially covering said plurality of holes when movement of said piston rod assembly exceeds a specified distance, said progressive closing of said third flow path providing a progressively higher resistance to the movement of said piston rod assembly, said sleeve being operable to simultaneously cover all of said plurality of holes to fully close said third flow path.

2. The two stage shock absorber according to claim 1 wherein said piston rod assembly comprises a piston rod and a piston nut, said plurality of holes extending through said piston nut.

3. The two-stage shock absorber according to claim 1 wherein said valve assembly comprises a compression valve assembly and a rebound valve assembly.

4. The two stage shock absorber according to claim 1 wherein said sleeve is frictionally held by said pressure tube.

5. The two stage shock absorber according to claim 1 wherein said sleeve is operable to progressively close said plurality of holes.

6. A two-stage shock absorber comprising:
   a pressure tube defining a chamber;
   a piston rod assembly disposed within said chamber;
   a valve assembly fixably attached to said piston rod assembly and slidably engaging said pressure tube within said chamber, said valve assembly dividing said chamber into an upper and a lower working chamber, said valve assembly providing a first and a second fluid flow path between said upper and lower working chambers completely through said valve assembly, said first and second flow paths of said valve assembly being totally separate from one another; and a sleeve slidably disposed on said piston rod assembly, said piston rod assembly defining a hole located at a base of a groove, said groove extending from said hole in a helical spiral along an outer surface of said piston rod assembly to a terminal end to create a third separate and distinct flow path extending between said upper and lower working chambers, said sleeve being operable to progressively close said third flow path by progressively covering said groove from said hole to said terminal end when movement of said piston rod assembly exceeds a specified distance, said progressive closing of said third flow path providing a progressively higher resistance to the movement of said piston rod assembly, a depth of said groove decreasing from said hole to said terminal end, said sleeve being operable to simultaneously cover said hole and said groove to fully close said third flow path.

7. The two stage shock absorber according to claim 6 wherein said piston rod assembly comprises a piston rod and a piston nut, said hole and said groove being disposed in said piston nut.

8. The two-stage shock absorber according to claim 6 wherein said valve assembly comprises a compression valve assembly and a rebound valve assembly.

9. The two stage shock absorber according to claim 6 wherein said sleeve is frictionally held by said pressure tube.

10. The two stage shock absorber according to claim 6 wherein said sleeve is operable to progressively cover said hole and said groove.

* * * * *